Oct. 2, 1928.
M. H. FORD
CYCLOPLANE
Filed May 29, 1925         3 Sheets-Sheet 1
1,686,080
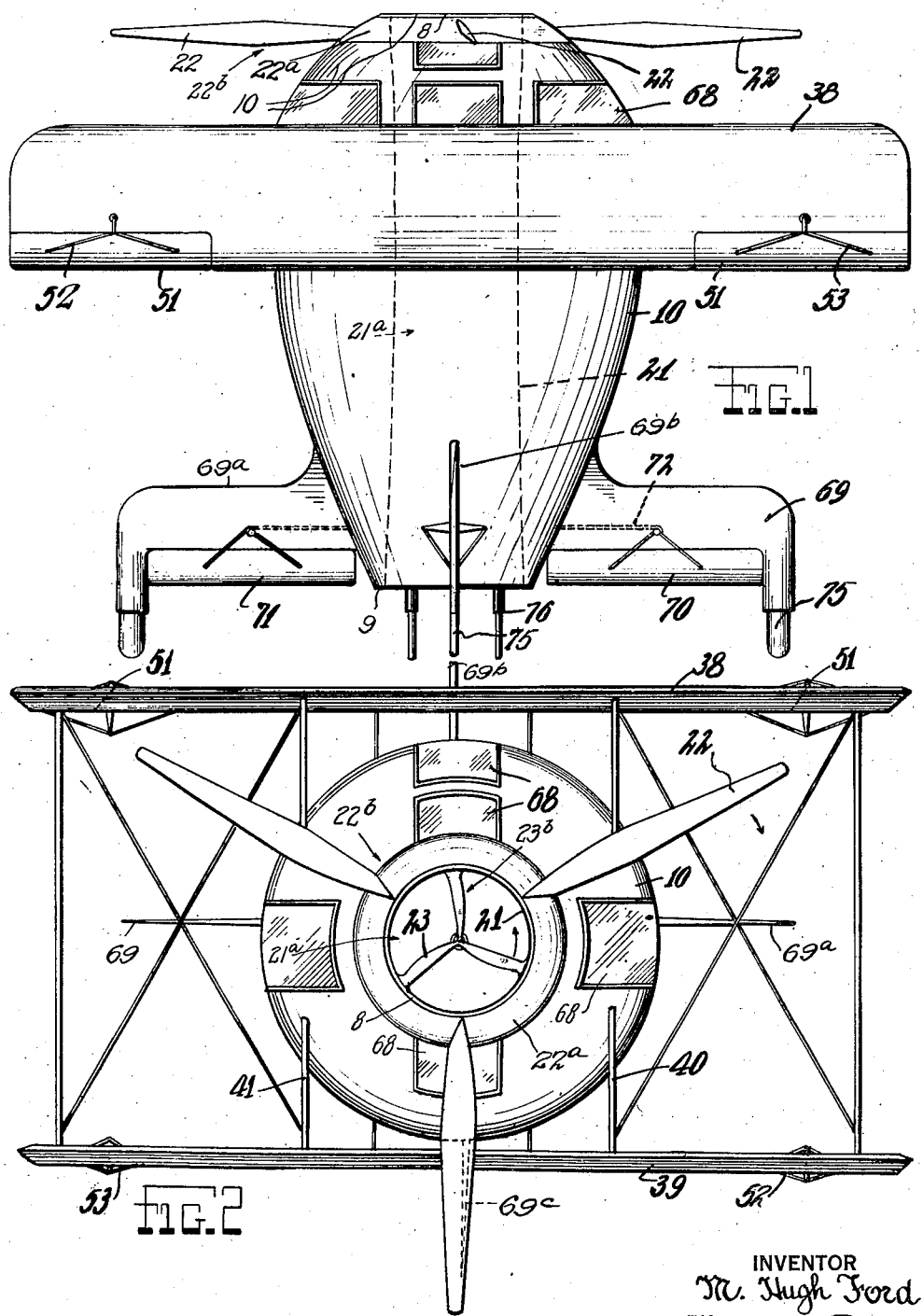
INVENTOR
M. Hugh Ford
BY
ATTORNEY Oct. 2, 1928.
M. H. FORD
1,686,080
CYCLOPLANE
Filed May 29, 1925     3 Sheets-Sheet 2
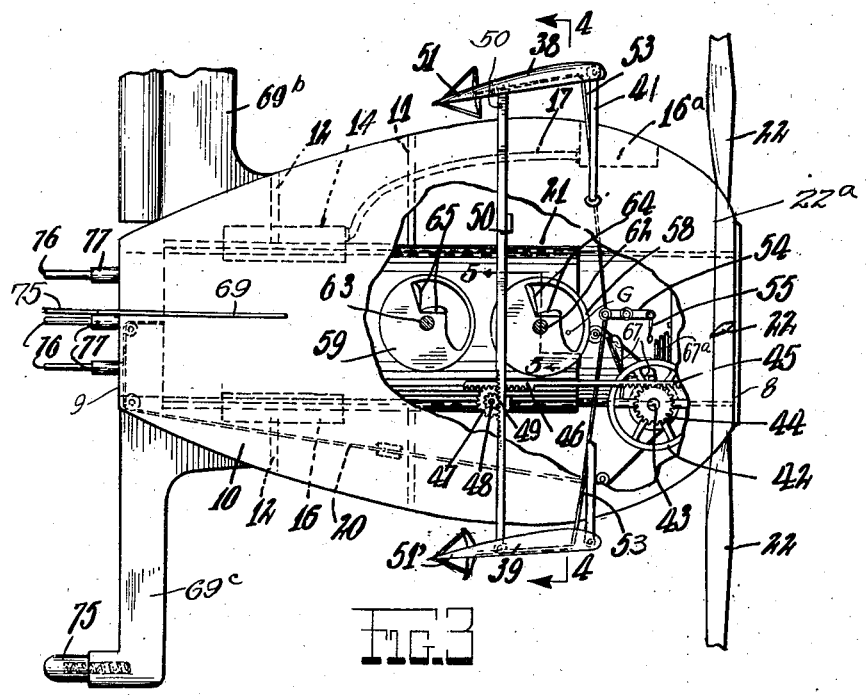
Fig.3
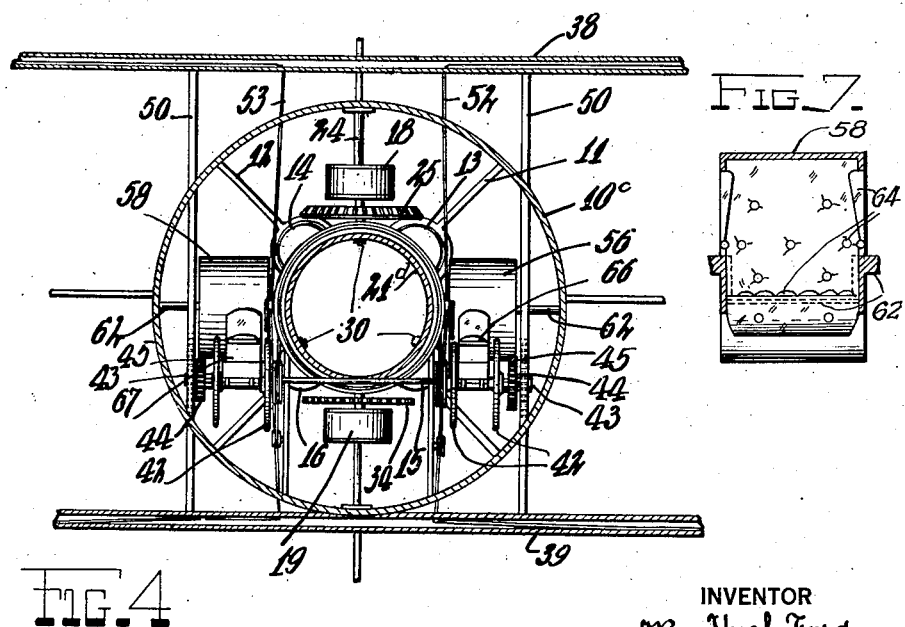
Fig.4
Fig.7
INVENTOR
M. Hugh Ford
BY
ATTORNEY Oct. 2, 1928.
M. H. FORD
CYCLOPLANE
Filed May 29, 1925      3 Sheets-Sheet 3
1,686,080
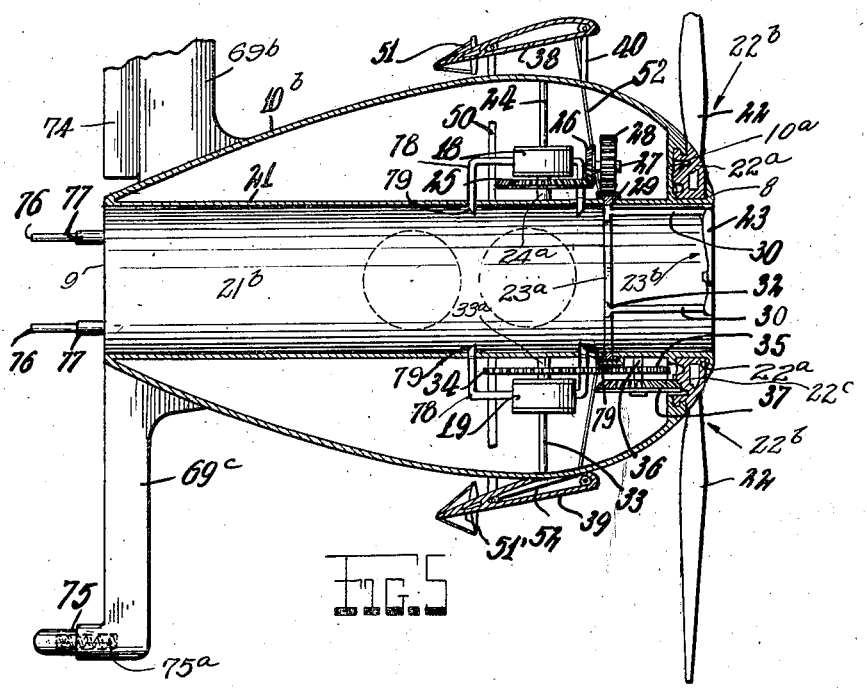
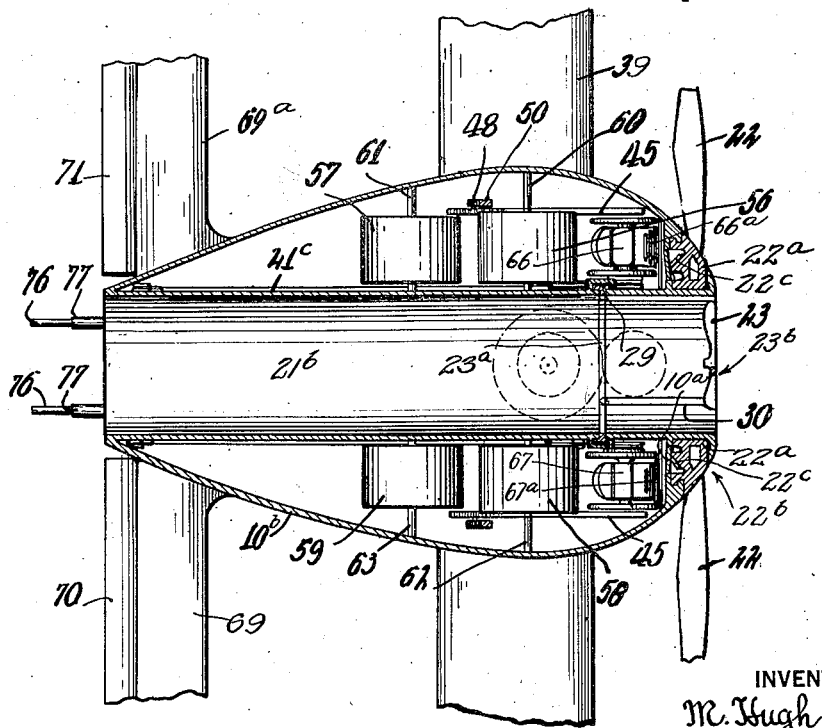
INVENTOR
M. Hugh Ford
BY
ATTORNEY Patented Oct. 2, 1928.

1,686,080

UNITED STATES PATENT OFFICE.

MICHAEL HUGH FORD, OF JERSEY CITY, NEW JERSEY.

CYCLOPLANE.

Application filed May 29, 1925. Serial No. 33,597.

This invention relates to aircraft and particularly to a cycloplane, which is a novel helicopter, an object of the invention being to provide an aircraft capable of ascending directly from, and alighting vertically on, a horizontal surface, land or water, and capable also of carrying a useful load.

Another object of the invention is to provide an aircraft with a streamlined outer surface, an inner surface forming a wind raceway, and a pair of propellers, one of which, adapted to revolve in one direction, has its base or ring in said outer surface, and the other of which, adapted to revolve in the opposite direction, has its base or ring in the inner surface.

A further object of the invention is to provide a helicopter with revolvable seating means which, by their own weight, constantly maintain an upright position as the attitude of the helicopter is changed.

A still further object of the invention is to provide operable fuel carrying or load carrying means, movement of which, along suitable tracks, within the aircraft, is controllable by the operators.

The invention moreover comprises novel and improved alighting means, by the use of which alighting on the trailing end of the air craft is accomplished, empennage parts being utilized for that purpose.

Other objects and advantages of the invention will hereinafter appear.

In the accompanying drawings:

Fig. 1 is a dorsal elevation of the cycloplane in vertical attitude;

Fig. 2 is a front elevation of the same in horizontal attitude;

Fig. 3 is a side elevation, with parts removed, to give a partial interior view;

Fig. 4 is a transverse section of the body taken on line 4—4 of Fig. 3 and showing some interior parts;

Figs. 5 and 6 are respectively, longitudinal, vertical and horizontal mid sections of the body and propeller rings, showing also some of the interior arrangements;

Fig. 7 is a section of a seating device, enlarged, and taken on line 5—5 of Fig. 3.

Streamlined from entering edge 8 to trailing edge 9, this aircraft comprises an outer wall the covering 10 of which may be of any well known material, such as sheet metal, the covering $21^b$ (see Fig. 5) of the inner wall, which forms a windrace 21 throughout the body, being preferably of like material.

Forming, in the body of the craft, a rearwardly part of a circumferential channel or groove, to accommodate the ring of an outer propeller $22^b$, to be hereinafter described, each longitudinal rib or longéron $10^b$ of the framework of the outer wall terminates and has, preferably formed therewith, adjacent the termination, the end of a radially disposed support or truss $10^a$, the opposite end of which is secured to a longitudinal rib or longéron $21^c$ of the framework of the windrace wall. Thus formed into a pair, each outer and inner longéron the number of which may be according to requirements, is also joined at the trailing edge 9. Additional trusses 11, 12 may be used.

Transversely of the craft (see Fig. 4), the longérons $10^b$ and $21^c$ of the outer and inner walls are, at intervals throughout their length suitably joined to circular ribs, as at $10^c$ and $21^d$ respectively, said longérons being also joined in a ring at the trailing edge 9 and, in a ring, at the leading edge 8. Preferably, the framework of the body of the craft is of tubular metal.

Adjacent the entering edge 8, the forward face of the groove or bearing for the ring $22^a$ of the propeller $22^b$, above referred to, is formed in part by the rearwardly inclined ends of the longérons $21^c$. Adapted to revolve in said groove, said ring has, attached to or formed therewith, at suitable pitch angle, a number of aerofoils or blades 22, the lengthwise and transverse dimensions of which may be as required. The outer surface of this gear ring $22^a$ is streamlined with adjacent surfaces 10 of the body. It will be noted that, by this construction, heavy, inefficient parts of blades, central shaft and hub, are eliminated.

Forming, in the wall of the windrace 21, a circular groove or channel, in which is journalled a ring $23^a$ of an inner propeller $23^b$, to be hereinafter described, each longitudinal rib $21^c$ is formed with a re-entering or inturned portion, as shown.

Normally, while the craft flies in a horizontal plane, the centre of gravity G, which, as will presently be explained, is controllably changeable, is maintained approximately on the transverse vertical plane of the line 4—4

(Fig. 3). Preferably constructed in cross section to conform in shape with the wall of the windrace and with the bifurcated terminals of trusses 12, a container 16, adapted for load carrying purposes, is, at one side of the craft, on a suitable track on said wall, movable on operation of the inner control wheel 42, through the medium of a cable or lead 20 which, suitably attached to said container, passes over guide sheaves, as shown, and into appropriate connection with said control wheel. Said container is movable between an after position, adjacent the trailing end 9, and a forward position adjacent the transverse plane of the line 4—4. Rearward movement of said container, which may be held stationary at any point between said positions, changes the centre of gravity G rearwardly, and forward movement of the container changes said centre of gravity forwardly. On the same side of the craft, the load carrying container 14 is movable similarly to the container 16, and the containers 13 and 15, on the opposite side of the craft, are in like manner movable, on operation of the inner control wheel 42.

These devices 13, 14, 15, 16, about equidistantly located on a circular line having its center on the longitudinal axial line of the craft, are (see Fig. 4) located at a distance from said axial line; and the weight of a particular device on one side of the craft, the latter being in a vertical position, as at Fig. 1, on the landing surface, prevents said craft from overbalancing to the opposite side, said devices being adjacent the trailing end 9.

One of these containers, as 14, is used for motive fluid carrying purposes and is provided with a flexible pipe or lead 17, which is adapted to wind and unwind on a drum, not shown, as said container is moved fore-and-aft. Through said lead fluid is forced, by any well known means, from the main tank 14 to a supply or feed tank 16ª which, positioned above the horizontal plane of the engine 18 and above the horizontal plane of the engine 19 (as in horizontal attitude of the craft) and also positioned above the horizontal plane of said engines 18 and 19 in vertical attitude of the craft, is adapted to supply fluid through a suitable lead, (not shown,) by gravitation, to said engine 18 and to said engine 19, in both of said positions.

It is proposed to install, in this fluid carrying container 14, baffles or transverse partitions, in which are suitable holes to prevent a sudden diplacement of fluid or variable load in said container, as the helicopter changes its attitude during flight. It is also proposed to instal, preferably in the outer wall adjacent the end 9, and opposite the after end of the container, a trapdoor, through which the container may be dropped if required.

Diagrammatically represented and designated in its entirety by the numeral 19, the motive power plant comprises an internal combustion engine, secured as at 33 to the framework of the outer wall. Suitably journalled at the framework of the windrace wall, said engine 19 has a rotary shaft 33ª to which is attached a gear wheel 34 the teeth of which engage in mesh with the teeth of a gear wheel 35 on a shaft 36. Said shaft has attached thereto a bevel gear 37, which, between two of the supports 10ª, meshes with a bevel gear 22ᶜ on the ring of the outer propeller, thus providing means of transmitting power to said propeller from the engine or motor 19, which is operable by the occupant of the seating means 66 or 67.

Designated in its entirety by the numeral 18, another internal combustion engine, secured at the outer wall as at 24, has, attached to a rotary shaft 24ª, which is suitably journalled at the windrace wall, a bevel gear 25 which meshes with a bevel gear 26 attached to the shaft 27. Attached also to said shaft is a gear wheel the teeth 28 of which engage in mesh, between two of the re-entering portions of the longérons 21ᶜ, with teeth 29, on a ring 23ª, of the propeller 23ᵇ referred to above. Attached at their ends, as at 32, to the face of said ring, which is flush with the surface 21ᵇ of the windrace, are supports 30 to the opposite ends of which are suitably attached the outer ends of aerofoils or blades 23. Said blades, having suitable pitch, are joined at their inner ends, at the longitudinal central line of the windrace.

As methods of constructing tubular metal frames are well understood a detailed description of the framework of the main planes 38, 39, and of the empennage planes, is not given. Journalled in the suitably formed, top tubular endings of the leading fixed struts 40, 41, as shown (see Figs. 3 and 5), is the leading, transverse main spar of the dorsal plane 38, the leading transverse spar of the frontal plane 39 being journalled in the under tubular ends of said fixed struts 40, 41. The after transverse spar of the first mentioned plane 38 is journalled in the top tubular endings on the after, movable struts 50, and the after transverse spar of the plane 39 is journalled in the under tubular endings of said movable struts 50.

Attached at the outer end of the shaft 43, on one side of the craft, (Fig. 3) there is a control wheel 42 and a gear 44 which, at one end of a rack bar 46 engages in mesh therewith, the opposite end of said bar engaging with a gear 47 on a shaft 48. This shaft 48 has also attached thereto a gear 49, which meshes with a rack on the strut 50. Said strut is slidably movable, intermediate its ends, through the outer wall of the craft, and the angle of the planes 38, 39 is changeable, through position parallel to the longitudinal axis of the craft, or zero incidence, on operation of said wheel 42. Operable by the occupant of the seating means 66, on the opposite side of the craft, the mechanism for operating said planes, comprising an outer control wheel 42 and associated gears, is like the mechanism on the first mentioned side, which is operable by the occupant of the seating means 67. These planes 38, 39 are adapted for relatively uniform movement on operation of either or both of said control wheels.

The planes 38, 39 are respectively equipped with ailerons 51, 51', operable through the medium of leads 52, 53 which pass over guide sheaves to the operating levers 54, 55.

On a suitably journalled shaft 62, a revolvable cabin or device 58, in the structure of which there are appropriate openings, is provided. Within said cabin there are secured seating means, as at 64 (see Fig. 7), the weight of which automatically maintains the cabin in a constantly upright position, as the attitude of the craft is changed. On the shafts 62, 63 there are, with additional seating means as at 65, additional rotary devices 56, 57, 58, 59.

The motor 19 is arranged within a cabin or compartment formed by a bulkhead which it is proposed to instal horizontally of the lower forward part of the craft (as in horizontal attitude), said bulkhead having also a vertical downwardly turned section just in rear of said motor 19 and associated gears. The motor 18 is arranged within a cabin or compartment formed by a bulkhead which extends horizontally of the upper forward part of the craft, said bulkhead having also a vertical upwardly turned section just in rear of said engine and associated gears. Adjacent to and in rear of the seating means 67, on one side of the craft, a vertically positioned bulkhead joins the horizontal portions of said first mentioned bulkheads, thus forming a cabin within which said seating means, and appropriate controls, are situated. It will be noted that the horizontal portion of said first mentioned bulkhead forms a floor, on one side of the craft, for the last mentioned cabin and a roof for the first mentioned cabin; that the horizontal portion of the second mentioned bulkhead forms a floor for the cabin within which the engine 18 is positioned and a roof for the cabin within which the seating means 67 and control wheels 67ª are positioned; that the vertical bulkhead which forms the after wall of the last mentioned cabin forms a horizontal floor for the operator of the control wheels 67ª in vertical attitude of the craft; and that each of the two first mentioned vertical sections forms, in vertical flight attitude, a horizontal footway for one of the two first mentioned cabins. On the opposite side of the craft, the seating means 66 and control wheels 66ª are positioned within a cabin which is formed just similarly to the cabin within which the seating means 67 are positioned. Under substantially indoor conditions, within the cabins or compartments, between which suitable passage ways and communication means, including transparencies, are provided, the usual instruments and control facilities are located.

To serve the usual purposes, including admission of light to the interior and provision of means of observation for the operating crew and passengers, windows or transparencies, 68 are provided. Entrance means, not shown in the drawings, are provided in the walls opposite the seating means.

Adapted for movement within the rearwardly extension of the right horizontal stabilizer 69, a landing plane or member 75, which is a stabilizer during flight, is provided. Said member has thereon, within said extension, a suitable weight absorbing spring which is just like the spring indicated at 75ª. This plane 69 is equipped with an elevator 70, operable through a lead 72 from the control cabin wherein is situated the seating means 67. The left horizontal stabilizer 69ª, having an elevator 71 and a lead, is constructed just like the stabilizer 69, having also vertically acting landing gear like that shown at 75 and 75ª. A dorsal vertical stabilizer 69ᵇ, equipped with a rudder 74 and an operating lead, is provided. There is also a front vertical stabilizer 69ᶜ, which is equipped with a landing plane 75 and a weight absorbing spring 75ª.

The empennage, including the members 69, 69ª, 69ᵇ, 69ᶜ, serves as landing gear. Said members, located on opposite sides of the craft, as shown, prevent the latter, which therefore stands in vertical stability on an approximately level, land or solid surface, from overbalancing to either side. The after end of the body, approximately from the line of the after edges of the planes 38, 39, to the edge 9, is water-tight, and the craft, with the containers 13, 14, 15, 16 at the trailing end thereof, has sufficient buoyancy to remain afloat, said end lowermost.

Preferably, there is additional landing gear comprising a member 76 which, of any required length, has on a part thereof, interiorly of the body or hull, a suitable coil spring, not shown. There are four of these members which, adapted for movement in water-tight fittings, through the outer wall of the body, at the trailing end thereof, may be positioned within tubes 77.

Cooling means, as at 78, are provided, openings, as at 79, in the walls being provided for intake and exhaust purposes.

Power is supplied by the engine 19 to the propeller 22ᵇ which, with unlimited space available for using blades of high aspect-ratio and with correspondingly high slip-stream volume, at a comparatively low rate of speed of revolution obtains lift equal to the total weight of the craft. With the planes 38, 39 at zero incidence, and with the movable load carrying containers, 13, 14, 15, 16, at the trailing end 9, direct ascent is commenced by a slight increase of the rotary speed of said propeller.

Preferably, the propeller 23<sup>b</sup> is also used, with said propeller 22<sup>b</sup>, to produce lift, power being supplied to said propeller 23<sup>b</sup> by the engine 18. Initially, in ascension, rotation of the craft around its fore-and-aft axis is prevented by separate regulation, by the operating crew, of the rotary speed of said propellers, both of which meet undisturbed air, and rotation of each of which is in an opposite direction to the other. Additional increase of propeller rotary speed increases the velocity of the craft, which is then controllable by rudder, elevators and ailerons. The main planes 38, 39 may be used for control purposes.

At a high velocity, the direction of flight is changed from vertical to horizontal, the manœuvre being commenced by depression of the elevators, by movement of the load carrying containers 13, 14, 15 and 16 to the forward position, which is adjacent the plane of the line 4—4 already described. This arises a pitching moment and causes the craft to move forwardly into and past a horizontal position. As a downward path is commenced the elevators are raised and the main planes 38, 39 moved into the normal position of about five degrees positive incidence, thereby establishing a horizontal flight path, lift, during the manœuvre, passing mainly to said main planes from the lift producing propellers 22<sup>b</sup>, 23<sup>b</sup> each of which, in horizontal flight, exerts forward thrust, by driving a slipstream rearwardly.

From horizontal flight the craft is flown in an ascending direction, at a high velocity, the load carrying containers being moved during the manœuvre from the normal forward position at the line 4—4, to the trailing end position, which causes said end automatically, by the weight of said containers, to become lowermost and to maintain that position, thereby placing the craft in a vertically stable attitude, lift, during the manœuvre, passing from the main planes 38, 39 to the propellers 22<sup>b</sup>, 23<sup>b</sup>. With reduced application of power, and consequent lessening of propeller speed, the ascending velocity of the craft decreases and, before descent, which is in parachutal action, empennage end leading, the craft is momentarily halted. During descent, an increase of application of power retards downward velocity, and a further increase of power bodily halts the craft. Such halt, when arranged to take place at the horizon or alighting surface, constitutes alighting.

While in the foregoing there has been illustrated in the drawings and fully and clearly described in the specification such embodiment of this invention as constitutes the preferred form thereof, it will be understood that this embodiment is simply illustrative, that variations, without departing from the invention, may be resorted to, and that parts of the improvements may be used without others. Of course, by the embodiment of my invention herein disclosed, others skilled in the art to which the invention appertains are enabled to construct and use the same.

It is also desired to emphasize the fact that interpretation of the invention should only be conclusive when made in the light of the subjoined claims.

What I claim is:

1. An aircraft for vertical and horizontal flight, comprising a propeller, an elongated fuselage having an empennage with stabilizing fins, landing members carried by said fins for supporting the craft vertically upright on the ground, a movable load container in the fuselage, a pilot's control therefor, and means for shifting the craft from vertical to horizontal including said load container.

2. In an aircraft for vertical and horizontal flight, comprising a stream-lined body and a propeller having a revolvable ring with an outer surface stream-lined with said body, an empennage comprising a horizontal stabilizing plane on each side of said body, each of said planes comprising a positive air pressure surface, and a vertically movable landing member, comprising also a positive air pressure surface, carried by each of said planes.

3. In an aircraft for vertical and horizontal flight, comprising a movable load container for vertical descent, the combination of an empennage having stabilizing planes for horizontal flight, a movable member carried by each of said planes, and means for alighting vertically including said planes and said members.

4. In a helicopter, comprising an elongated body having a water-tight after end, a propeller for vertical and horizontal flight, suspension planes for horizontal flight, means for changing the helicopter from one of said flight positions to the other, including adjustable load carrying means and a control therefor, and means comprising said after end, the load carrying means being located therein, for maintaining the helicopter vertically afloat.

5. In an aircraft adapted for standing in a vertically upright position on a horizontal surface, comprising an elongated body having a water-tight after end and adjustable load carrying means therein, said means adapted also to maintain the craft in a vertical position in the air, a propeller for vertical ascent, a motor to operate the propeller, means comprising said controls for halting the propeller and arresting ascent, and said last mentioned means adapted to halt the aircraft in the air.

6. In an aircraft adapted for standing in a vertically upright position on the ground, comprising an elongated body having an after end and adjustable load carrying means therein, said means adapted also to maintain the craft in a vertical position in the air, stabilizing planes on different sides of the after end for maintaining said position on the ground, a propeller for vertical flight, a motor therefor, and means comprising said controls for halting the propeller, and said load carrying means for maintaining the vertical position, for halting the aircraft in the air.

7. In an aircraft adapted for halting in the air, comprising a propeller for vertical flight, a motor and controls therefor, movable load carrying means adapted for location at the after end of the aircraft for maintaining the latter in a vertical position, means, comprising said controls for halting the propeller, and said load carrying means for maintaining the vertical position, for reversing the direction of flight of the aircraft, commencement of descent being by gravitation.

8. An aeronautic or aquatic vessel for vertical and horizontal travel having movable load carrying means therein, said vessel having an elongated body, means for controllably moving said means to the after end of said body, maintenance of said load carrying means at said end adapted to maintain said vessel in a vertical position, said end lowermost, and means comprising said load carrying means for changing from vertical to horizontal attitude.

9. In an aeronautic or aquatic vessel adapted for vertical and horizontal travel, comprising an elongated body having an after end, movable load carrying means within the body and a control therefor, and means comprising said load carrying means for maintaining the vessel in a vertical position, afloat or during movement.

10. In an aircraft adapted for vertical and horizontal flight, comprising an elongated body having a trailing end, propulsion means comprising a propeller and a motor therefor, adjustable load carrying means, controls for said means and for the motor, means for descending vertically comprising the controls; an empennage comprising stabilizing planes, said planes located on different sides of the craft to support said craft vertically upright on the ground, an extension of each of said planes located further aft than said trailing end to protect the latter as the aircraft lands; and a spring controlled landing member associated with each of the extensions.

11. In a helicopter having a streamlined body, windows and entrance means therein, means for moving the centre of gravity of the helicopter including a movable fuel tank, said tank constructed to avoid a sudden shifting of the fuel therein during movement of the helicopter, seating means for operators and controls adjacent thereto, propulsion means comprising an outer propeller and an inner propeller, said propellers adapted also for sustension purposes, stabilizing planes and control planes carried thereby, and vertically movable landing members carried by the stabilizers.

12. In an aircraft comprising an elongated body, said aircraft adapted to land vertically, empennage end leading, a plurality of operable load carrying devices adapted to be maintained each in a position distant from the longitudinal axial line of the aircraft, at said empennage end, and maintenance of said devices in each of said positions adapted to prevent said aircraft from overbalancing to the opposite side.

13. A helicopter having an elongated body, said body comprising a trailing end, means for changing the attitude of said helicopter from vertical to horizontal and vice versa, said means comprising adjustable load carrying means for shifting the centre of gravity, and maintenance of said load carrying means at said trailing end adapted to maintain the helicopter in a vertical attitude.

14. In an aircraft having an elongated body, said aircraft adapted to land endwise, means for maintaining the aircraft in a vertical position on a horizontal surface, said means comprising operable load carrying devices, and means, comprising a wind-race, for arranging said devices each at a distance from the longitudinal axial line of the aircraft.

15. In a vessel comprising an elongated body with a longitudinal opening throughout, said vessel having a water-tight after end, and said vessel adapted when at rest to accommodate an acquatic surface in said opening, means for distributing load on different sides of said surface, and said vessel adapted also to maintain a vertical floating attitude, said load being in the after end.

16. In an aircraft adapted for flight in vertical and horizontal attitudes, comprising a propeller and a motor therefor, sustension planes, and a motive fluid container positioned distant from and above the motor in both of said attitudes, thereby providing means from which motive fluid may be fed by gravitation to the motor in both of said attitudes.

17. In an aircraft adapted for flight in vertical and horizontal attitudes, comprising a propeller and a motor therefor, sustension means comprising a main plane, a motive fluid container positioned distant from and above the motor in both of said attitudes, and means comprising a lead for supplying fluid by gravitation from said container to the motor in either of said attitudes.

18. In an aircraft adapted for flight in vertical and horizontal attitudes, comprising a propeller and a motor for the operation thereof, means for changing the craft from vertical to horizontal including a movable load container and a control therefor, a motive fluid container having a perforated partition therein for allowing normal movement of fluid in one of said attitudes, and means comprising said partition for preventing a sudden displacement of fluid as the craft changes from one of said attitudes to the other.

19. In a helicopter of the class described, the combination of a stream-lined body, with a longitudinal wind-race in said body, a shiftable fuel storage tank, a fuel feed tank and a flexible connection between said storage tank and the feed tank, said flexible connection adapted to be wound on and unwound from a drum carried by said body, and means comprising a control for shifting said storage tank to suit the conditions of flight, and to change the centre of gravity.

20. A helicopter comprising an elongated body, propulsion means, comprising an outer propeller, rotary seating means located within the body, said seating means adapted to maintain an upright position in vertical and horizontal flying attitudes of said helicopter, and means, comprising operable load carrying means, for changing said helicopter from one of said attitudes to the other.

21. In an aircraft of the class described, comprising a longitudinal wind-race having seating means adjacent thereto within the aircraft, said means revolvably supported to maintain an upright position during the different phases of flight of said aircraft, differential propellers, motors for operating said propellers, seating means for pilots in front of the motors, and means, comprising controls, for controlling the operation of said motors and the flight of the aircraft.

22. In an aircraft adapted for vertical and horizontal flight, including a body, a propeller, sustension means comprising a main plane, an adjustable load container and a control therefor, a revolvable shaft, a seating device on the shaft adapted to automatically by its own weight maintain an upright position during vertical and horizontal movement of the aircraft, and means comprising stabilizing planes, and vertically movable landing members carried thereby, for supporting the craft vertically upright on the ground.

23. In an aircraft adapted for flight in vertical and horizontal attitudes, comprising a propeller and a motor to operate the same, a control therefor, sustension planes, a movable load container and a control therefor, a bulkhead forming a footway for an occupant of the craft in one of said attitudes, and means comprising said load container and the controls for shifting the craft from one of said attitudes to the other.

24. In an aircraft adapted for flight in vertical and horizontal attitudes, a propeller and a motor, a control for the operation of the same, sustension planes, a movable load container and a control therefor, a bulkhead adapted to form a footway for an occupant of the craft in one of said attitudes, a portion of the bulkhead adapted to form a footway in the other of said attitudes, and means comprising a load container for changing the craft from one of said attitudes to the other.

25. In an aircraft adapted for flight in vertical and horizontal attitudes, comprising a propeller, sustension planes, a bulkhead to form compartments in the aircraft, said bulkhead adapted to form a floor for one of said compartments and a roof for another, and a movable load carrying device and a control therefor for shifting the craft from one of said attitudes to the other.

26. In a helicopter of the class described, a body having a wind raceway therethrough and compartment space within the body encircling the raceway, sustension means comprising main planes and connecting means therefor including movable struts, and controls for the struts; a plurality of load containers adapted for movement along and sectionally conforming in shape with the raceway, and controls for the containers; seating means for operators adjacent the controls in the front part of the body, and motors in rear thereof; bulkheads forming said space into compartments for the operators and for the motors, and means comprising said controls for controlling the flight of the helicopter in vertical and horizontal attitudes.

27. In an aircraft for vertical and horizontal flight, comprising a body having a streamlined outer surface, a compartment in the body, an outer propeller comprising a gear ring, a plurality of blades extending from the outer surface of the ring, and means for preserving the streamlined form of the aircraft including the surface of the ring.

28. In an aircraft for vertical and horizontal flight, including a propeller comprising a gear ring, a plurality of radially disposed blades extending from the outer surface of the ring, a fuselage having a streamlined surface thereon rearwardly of the ring, and means for streamlining the outer surface of the aircraft including the first and second mentioned surfaces.

29. In an aircraft, comprising a body with a streamlined outer surface, a propeller comprising a ring having a gear within the body, a plurality of blades extending from the periphery of the ring, and a streamlined portion of the aircraft formed by said periphery and said outer surface.

30. In an aircraft, in combiantion, a fuselage; a covering on the fuselage; a shaftless propeller comprising a ring with a surface forwardly of and streamlined with said covering, said propeller comprising also a gear on said ring within the fuselage, and a plurality of blades extending from said surface;

a surface forwardly of the ring; and a streamlined portion of the aircraft formed by both of said surfaces and said covering.

31. In an aircraft, in combination, an elongated fuselage having an outer covering thereon, a shaftless propeller comprising a revolvable ring having an outer surface, a gear internally of the ring and a plurality of blades extending from said surface, said covering and said surface forming a streamlined portion of the aircraft, a circumferential groove in the fuselage forming a bearing for the ring, and means comprising said bearing for eliminating central structure from the aircraft on the plane of said propeller.

32. In an aircraft, in combination, an elongated body having a circumferential groove therein for accommodating the gear ring of a shaftless propeller, said propeller comprising a plurality of blades extending outwardly from the periphery of the ring, and a longitudinal wind-race adapted to avoid the path of the blades of said propeller during flight of the aircraft.

33. In an aircraft, in combination, an elongated body having a circumferential groove therein for accommodating the gear ring of a shaftless propeller, said propeller comprising a plurality of blades extending outwardly from the periphery of the ring, a motor to operate the propeller, and a longitudinal wind-race to avoid the path of the blades of the propeller and the slipstream driven by said propeller.

34. In an aircraft, including in combination an elongated body having a circumferential groove therein for accommodating the ring of a shaftless outer propeller, a longitudinal wind-race throughout the aircraft, said propeller comprising a plurality of blades extending from the periphery of the ring, a shaft having a gear thereon meshing with a gear on the shaft of the motor, a bevel gear, also on the first mentioned shaft, meshing with a bevel gear internally of the ring of the propeller, and means including said wind-race and said ring for eliminating central structural resistance to the movement of the aircraft.

35. In a vessel having an elongated body, comprising a wall forming a longitudinal opening throughout the vessel, a shaftless propeller comprising a ring having a gear thereon within the vessel, an inner face on the ring and a plurality of concentrically associated radially disposed blades carried thereby, a practically smooth surface being formed by said inner face and said wall.

36. An elongated vessel adapted for endwise movement, comprising an entering edge and a trailing edge, an opening throughout the vessel formed by a wall between said edges; a shaftless propeller for the vessel, comprising a gear ring having an inner face, said face encircling the opening, and a plurality of concentrically associated radially disposed blades carried by the ring within the opening, a practically smooth surface being formed by said inner face and the wall adjacent thereto.

37. In an aircraft comprising an elongated body having a longitudinal opening throughout for accommodating the slipstream of a shaftless propeller, a compartment in the body, said propeller comprising a plurality of concentrically associated radially disposed blades, a ring to carry the blades within the opening, a gear on the ring within the compartment, and means comprising said opening for eliminating structure in front and in rear of said blades.

38. In an aircraft having a longitudinal opening throughout for accommodating the slipstream of a shaftless propeller, comprising a compartment within the body of the aircraft, said opening formed by a wall, a reentering groove in the wall, a ring adapted to rotate in said groove and to carry said blades within the opening, a gear on the ring within the compartment, and means comprising the opening and a bearing formed for the ring by said groove for eliminating central structure in front and in rear of the shaftless propeller.

39. In an aircraft comprising a shaftless propeller, a motor for operating the propeller, a longitudinal opening throughout the aircraft formed by a wall for accommodating the slipstream of the propeller, said propeller comprising a gear ring and a plurality of blades carried thereby within the path encircled by the wall, said wall being adjacently flush with the inner face of the ring, and means for eliminating structure in front and in rear of the shaftless propeller, said means including the opening and a groove in the wall thereof forming a bearing for said propeller gear ring.

40. In an aircraft comprising a shaftless propeller, a motor for operating the same, a longitudinal opening throughout the aircraft formed by a wall for accommodating the slipstream of the propeller, said propeller comprising a gear ring located rearwardly of the entering edge of the aircraft, a plurality of radially disposed blades associated at their inner terminals and carried by the ring in the path encircled by the wall, means, including the opening and a groove in said wall forming a bearing for the ring, for eliminating central structure in front and in rear of the propeller, and supports connecting the inner face of the ring with the outer terminals of the blades and locating the latter at said entering edge for meeting undisturbed air.

41. In an aircraft adapted for vertical flight, comprising an elongated body adapted for resting in a vertically upright position on a horizontal surface, said body comprising an entering edge, a wall rearwardly thereof, a trailing edge, a motor for operating a shaftless inner propeller and a control for the same, said wall forming an opening throughout the aircraft for accommodating the slipstream of the propeller, said propeller adapted for operation at the entering edge, and means comprising said propeller for obtaining lift and ascending vertically by driving a slipstream of light air from the leading edge directly through the opening, escape of the slipstream being through heavier air at the trailing edge.

42. In an aircraft comprising a shaftless inner propeller, an elongated body comprising an entering edge, a longitudinal opening throughout the body, means comprising a motor and a gear on the shaft thereof for operating the propeller, said propeller comprising a ring and a gear peripherally thereof operatively connected by gearing with the gear on the shaft of the motor, a plurality of blades internally of the path of the inner face of the ring, and supports connecting the ring and the blades and locating the latter at the entering edge for meeting undisturbed air.

43. In an aircraft comprising a wind-race, an outer propeller, an inner propeller, said propellers adapted for operation at different rates of rotary speed and in different directions of rotation, and both of said propellers adapted to rotate around the longitudinal axial line of the aircraft.

44. In an aircraft, comprising a wind-race, an outer propeller having a gear ring, an inner propeller comprising a gear ring, a groove in the outer surface of the body of the aircraft to accommodate the ring of the outer propeller, a groove in the wall of said wind-race to accommodate the ring of the inner propeller, and a separate motor for the operation of each of said propellers.

45. In an aircraft comprising an elongated body, a shaftless outer propeller, comprising a ring with radially disposed external blades, said propeller adapted to rotate in one direction; a shaftless inner propeller, comprising a ring with radially disposed internal blades, said propeller adapted to rotate in the opposite direction; and a longitudinal opening adapted to avoid the path of the outer propeller, said opening adapted also to accommodate the blades of the inner propeller.

46. In an aircraft, the combination with an elongated body and an outer propeller; said body having a groove in the outer surface thereof; and said propeller having a ring adapted to rotate in said groove; of a wind-race having a groove in the wall thereof; and an inner propeller comprising a ring, the ring of said inner propeller adapted to rotate in the groove of said wind-race.

47. In a helicopter comprising an elongated body, a wind-race throughout said body, a propeller associated with the outer surface of said body, a propeller associated with the wall of the wind-race, a separate motor to operate each of said propellers, and means for controlling the operation of said motors.

48. In an aircraft of the class described, a motor, an outer propeller comprising a ring, means for operably connecting said motor with said propeller comprising a gear on said ring; an inner propeller and a motor therefor, said propeller comprising a ring, a plurality of blades, a gear on the ring for operatively connecting the same with the motor; and supports to connect the ring of the inner propeller with its blades.

49. In an aircraft of the class described, a wind-race, a ring and a plurality of blades extending therefrom and constituting therewith an outer propeller; another ring, said ring adapted to carry a plurality of blades, said blades arranged concentrically of said ring and constituting therewith an inner propeller; a separate motor to operate each of said propellers, one of said propellers adapted to revolve to the right and the other propeller adapted to revolve to the left, and means comprising controls for operating each of said propellers.

50. In an aircraft comprising an elongated body, propulsion means, an opening throughout the aircraft formed by a wall encircling the line of flight of the aircraft, said means comprising a shaftless propeller having a gear ring peripherally streamlined with said body, and a plurality of blades extending from the ring; a shaftless propeller comprising a gear ring having its inner face flush with the adjacent part of the wall, and a plurality of blades carried by said ring in the path of the opening; and means comprising said body, and bearings formed therein for the rings of the propellers, for adapting the blades of said propellers for meeting undisturbed air, said propellers adapted to revolve in different directions around said line of flight.

51. In an aircraft, including an elongated body having an outer surface and a watertight after end, a longitudinal wind-race, an outer propeller associated with said surface, an inner propeller associated with the wind-race, means comprising said wind-race for allowing the slipstream of the inner propeller to pass through the body, means comprising said propeller for accomplishing a direct take-off and direct alighting on land or water, and means comprising said after end for floating on water.

52. In an aircraft adapted for vertical and horizontal flight, in combination, an elongated body having a streamlined outer wall and a propeller comprising a ring peripherally streamlined therewith, a wind-race throughout the aircraft formed by a longitudinal wall, cabin space within the aircraft between said walls, and a shaftless propeller comprising a ring having its inner face flush with the part of said wind-race wall adjacent thereto.

53. In an aircraft for vertical and horizontal flight, including in combination a body and a propeller, a frontal sustension plane and a dorsal sustension plane, a plurality of fixed struts terminally pivotally associated with said planes adjacent their leading edges, a plurality of movable struts terminally pivotally associated with said planes adjacent their trailing edges, controls within the body associated with the movable struts for changing the angle of incidence of said planes, and means including said planes, and a movable load container, for changing the craft from a vertical to a horizontal position and vice versa.

54. In an aircraft adapted for vertical ascent, comprising a movable load container for changing the craft from vertical to horizontal and from horizontal to vertical, a control for the container, a frontal sustension plane and a dorsal sustension plane, a plurality of fixed struts terminally pivotally associated with said planes adjacent their leading edges, a plurality of movable struts terminally pivotally associated with said planes adjacent their trailing edges, a control for said movable struts to change the angle of incidence of said planes, vertically movable landing means carried by the aircraft, and means comprising said controls for descending vertically and alighting.

55. In an aircraft adapted for vertical ascent, comprising a movable load container for changing the craft from vertical to horizontal and from horizontal to vertical, a control for the container, a frontal sustension plane and a dorsal sustension plane, ailerons on said planes, fixed struts terminally pivotally associated with said planes adjacent their leading edges, movable struts terminally pivotally associated with said planes adjacent their trailing edges, a control for said movable struts to change the angle of incidence of said planes, vertically movable landing means carried by the aircraft, and means comprising said controls for descending vertically and alighting.

In testimony whereof I have affixed my signiture.

M. HUGH FORD.